United States Patent [19]

Hienerwadel et al.

[11] Patent Number: 4,947,248
[45] Date of Patent: Aug. 7, 1990

[54] HYBRID ENCODER FOR VIDEO SIGNALS COMPRISING A MOTION ESTIMATOR AND AN INTER-INTRAFRAME ENCODING SELECTOR WHICH COMPRISE A COMMON CALCULATION MODULE

[75] Inventors: Klaus Hienerwadel; Gerald Weth, both of Nuremberg, Fed. Rep. of Germany

[73] Assignee: U.S. Philips Corporation, New York, N.Y.

[21] Appl. No.: 333,485

[22] Filed: Apr. 5, 1989

[30] Foreign Application Priority Data

Apr. 6, 1988 [DE] Fed. Rep. of Germany ....... 3811535

[51] Int. Cl.$^5$ .............................................. H04N 7/12
[52] U.S. Cl. .................................... 358/135; 358/136; 358/105
[58] Field of Search ................. 358/105, 135, 136, 134

[56] References Cited

U.S. PATENT DOCUMENTS

| | | | |
|---|---|---|---|
| 4,442,454 | 4/1984 | Powell | 358/135 X |
| 4,802,006 | 1/1989 | Iinuma et al. | 358/135 |
| 4,837,618 | 6/1989 | Hatori et al. | 358/135 |

*Primary Examiner*—James J. Groody
*Assistant Examiner*—Victor R. Kostak
*Attorney, Agent, or Firm*—Michael E. Marion

[57] ABSTRACT

A hydrid encoder for video pictures comprising a motion estimator, and an inter-intraframe encoding selector which comprise a common calculation module. Known hybrid encoders for transmitting video pictures comprise a motion estimator and an inter-intraframe encoding selector. Due to the required high processing rate the motion estimator and the inter-intraframe encoding selector must have a parallel processing structure which leads to quite a considerable number of components. To this end a calculation module is proposed which can be used in the motion estimator and in the inter-intraframe encoding selector. Use of this invention, for example in hybrid encoders for video telephone apparatus.

6 Claims, 3 Drawing Sheets

HYBRID ENCODER FOR VIDEO SIGNALS COMPRISING A MOTION ESTIMATOR AND AN INTER-INTRAFRAME ENCODING SELECTOR WHICH COMPRISE A COMMON CALCULATION MODULE

BACKGROUND OF THE INVENTION

The invention relates to a hybrid encoder for video pictures in which neighboring pixels of a video picture are combined into sub-blocks, which encoder comprises a motion estimator and an inter-intraframe encoding selector.

A hybrid encoder of this type is known, for example from UPDATED SPECIFICATION FOR THE FLEXIBLE PROTOTYPE n×384 kbit/s VIDEO CODEC, CCITT SGXV, Working Party XV/1, Specialists Group on Coding for Visual Telephony, document #249, Jul. 1987. A hybrid encoder provides the possibility of encoding video data from a video data source into a signal having a low bit rate with a small loss of information. In this process two encoding principles, hence the name hybrid encoder, are used: the interframe principle and the intraframe principle.

In the interframe principle the correlation between time-sequential video pictures (this designation is used in this respect for frames and fields) is utilized. To this end the video data to be encoded are compared with prediction values and only the signal differences between these two signals are encoded and transmitted. The better the prediction values correspond to the video data to be encoded, the smaller the bit rate of the signal to be transmitted. In the intraframe principle the original contents of a video picture are transmitted while a bit rate reduction is achieved, for example by means of an adaptive quantizer.

Furthermore, it is known from the afore-mentioned publication that prediction values can be formed by means of a motion estimator. In video pictures with moving scenes successive video pictures have a comparable picture content. Some parts of the picture contents of two successive video pictures do not change at all (for example, a stationary background) while other parts of the picture contents in the actual picture only change their position with respect to the previous picture (for example, movements of a speaking person's mouth) and other parts are completely new as compared with the previous picture. If neither brightness nor colour content of a moved picture section change in the case of a movement, the position at which this picture section occurs in the subsequent video picture can be adequately characterized by means of a vector. Since the encoding of such a vector requires much fewer encoding data than the encoding of the entire picture section, the bit rate can be reduced in this manner.

To this end the video picture prior to the actual video picture is stored in a picture memory. A video picture is build up in the form of a matrix comprising a succession of pixels. Each pixel can be represented by three numerical values. The first numerical value is a measure of the brightness of the pixel (hereinafter referred to as luminance value). The second and third numerical values of a pixel represent the colour of the pixel (hereinafter referred to as chrominance value). The actual video picture is subdivided into a plurality of actual sub-blocks. To this end neighboring pixels of the video picture are joined to form each sub-block. A sub-block has, for example the size of eight by eight pixels and represents a section of the video picture. A plurality of previous sub-blocks located in the vicinity of an actual sub-block is selected by means of a search circuit from the previous video pictured stored in the picture memory. These previous sub-blocks are compared with the actual sub-block. The previous sub-block which is least distinguishable from the actual sub-block or which in the ideal case is identical to the actual sub-block is selected as a prediction value.

The transmission of the motion vector and the differences between the actual sub-block and previous sub-block selected as a prediction value only provides advantages if there is little distinction between the actual sub-block and the selected previous sub-block. With given picture contents it is more favorable under certain circumstances to transmit the entire actual sub-block. For this reason an inter-intraframe encoding selector checks which method is most favorable for transmitting the actual sub-block and it activates corresponding signal path switches.

Due to the required high processing rate, motion estimators and inter-intraframe encoding selectors should have a parallel processing structure with view to the currently available components, which leads to quite a considerable number of components.

SUMMARY OF THE INVENTION

The present invention has for its object to constitute a hybrid encoder of the type described in the opening paragraph in such a way that its structure is simplified.

In a hybrid encoder of the type described in the opening paragraph this object is solved in that the motion estimator and the inter-intraframe encoding selector have a common calculation module.

BRIEF DESCRIPTION OF THE DRAWINGS

An embodiment of the invention will be described in greater detail with reference to the accompanying drawings in which.

DETAILED DESCRIPTION OF THE INVENTION

The motion estimator and the inter-intraframe encoding selector form part of a hybrid encoder (not shown) for transmitting video pictures. The motion estimator determines, from previous sub-blocks of a previous video picture, a previous sub-block which among the previous sub-blocks available for selection is the best to be used as a prediction value for transmitting an actual sub-block. The inter-intraframe encoding selector decides whether the data quantity which is required for transmitting the actual sub-block by means of the selected previous sub-block serving as a prediction value, is less than the data quantity which is required for transmitting the actual sub-block as a whole.

Figure 1:
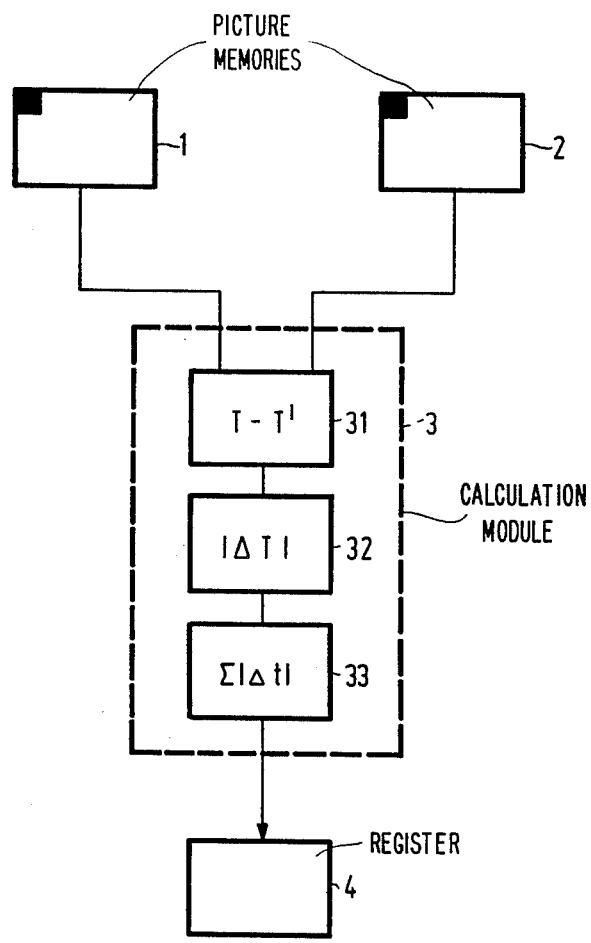
FIG. 1 shows a motion estimator

The motion estimator shown in FIG. 1 comprises a first and a second picture memory 1, 2, a calculation module 3 and a minimum value register 4. The calculation module 3 is composed of a subtractor 31, a device 32 for forming an absolute value and a summing device 33.

The actual video picture is stored in the first picture memory 1 and a previous video picture preceding the actual video picture is stored in the second picture memory 2. The pixels of the video pictures are stored as binary values in known manner in the form of luminance and chrominance values representing them. An actual sub-block T of the actual video picture to be transmitted is applied to a first input of the calculation module 3 via a selection circuit, which is not shown. A previous sub-block T' of the previous video picture stored in the second picture memory is selected via a search circuit, which is not shown, and is applied to a second input of the calculation module 3. The inputs of the calculation module are connected to a first and a second input of the subtractor 31. The subtractor 31 subtracts the luminance and chrominance values of pixels in the actual sub-block from respective luminance and chrominance values of corresponding pixels in a previous sub-block. The difference values are applied to the device 32 for forming an absolute value in which all negative difference values are multiplied by the value −1. In this way difference amounts are gained from the difference values which are applied to the input of the summing device 33. In the summing device 33 the difference amounts of the separate pixels are added up. Prior to each summation of the separate amounts the contents of the summing device are erased by a control pulse.

The output values of the summing device 33 are applied to the minimum value register 4. The value applied to the minimum value register 4 is compared by means of a logic circuit with the value already stored in the minimum value register 4. If the new value is smaller than a value which is already stored, the new value is stored, and if the new value is larger, the stored value is not changed. With each selection of each new actual sub-block the value in the minimum value register is simultaneously set to the largest possible value which can be stored.

Whenever a new value is stored, the logic circuit generates a control pulse which is applied to the search circuit. With this control pulse the address, which corresponds to the motion vector and which is formed for the selected previous sub-block of the previous video picture, is stored in a vector register not shown. Each of the previous sub-blocks located in the vicinity of the actual sub-block is compared with the actual sub-block as described above. In this way the previous sub-block among all of the selected previous sub-blocks is most similiar to the actual sub-block with respect to the summed difference amounts, is chosen to serve as a prediction value. After running through all selected previous sub-blocks the optimum motion vector is then present in the vector register. The sum of the difference amounts, which sum is simultaneously present in the minimum value register 4, is a measure of the length of the transmission code required for transmitting the actual sub-block by means of this selected previous sub-block serving as a prediction value. The calculation of this value also forms part of the inter-intraframe encoding selection.

Figure 2:
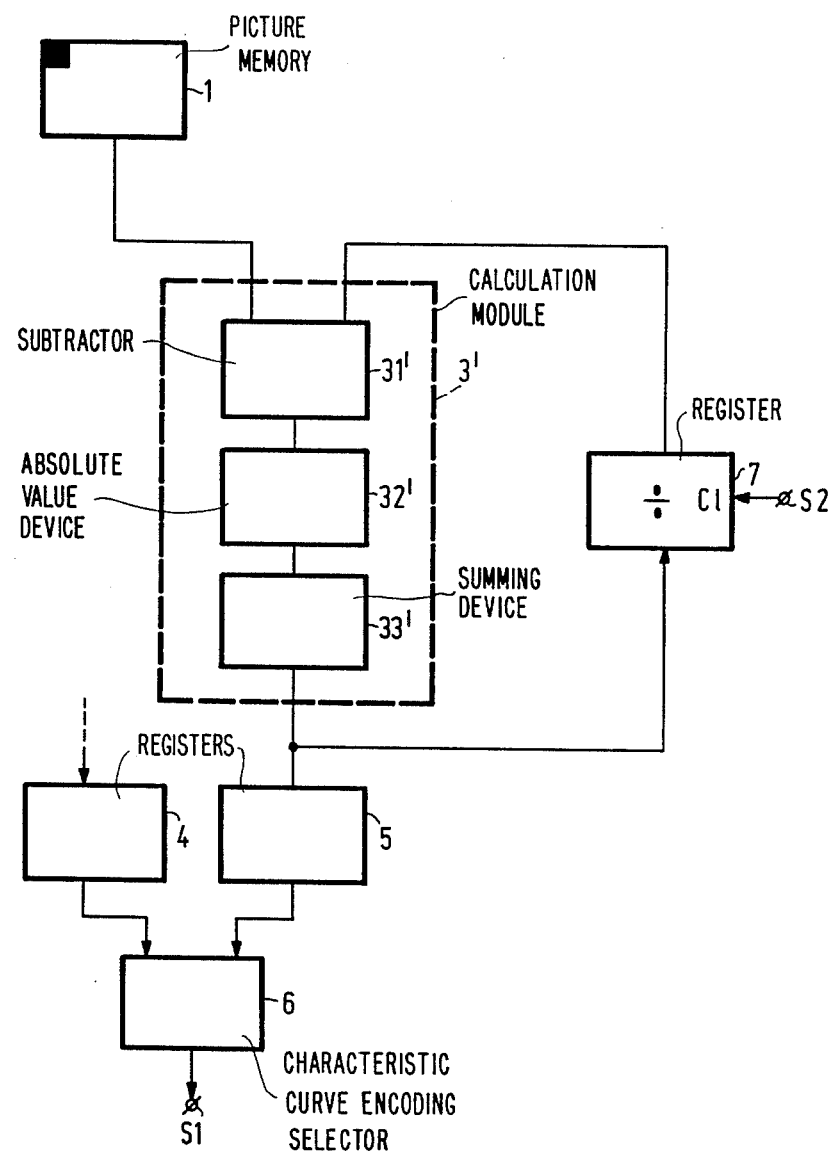
FIG. 2 shows an inter-intraframe encoding selector

FIG. 2 shows an inter-intraframe encoding selector composed of a second calculation module 3'. The second calculation module 3' is not distinguished from the first calculation module 3 which is used for the motion estimator. The second calculation module is therefore also composed of a subtractor 31', a device 32' for forming an absolute value and a summing device 33'. Moreover, the inter-intraframe encoding selector comprises the picture memory 1, the minimum value register 4, of the motion estimator shown in FIG. 1 a mean value register 5, a characteristic curve encoding selector 6 and a register 7. A sub-block T of a field of the actual video picture stored in picture memory 1 is applied to the first input of the calculation module 3', likewise as for the motion estimator. The output of the calculation module 3' is connected to the mean value register 5. The minimum value register 4 is the minimum value register of the motion estimator already described in FIG. 1.

The outputs of the minimum value register 4 and the mean value register 5 are connected to inputs of a characteristic curve encoding selector 6. The characteristic curve encoding selector 6 is formed as a PROM in this embodiment. Dependent on the output values of the minimum value register 4 and the mean value register 5, which are applied to its address inputs, a single bit is supplied at a signal output S1. This bit switches in known manner the signal path switch of the hybrid encoder for either intraframe encoding or interframe encoding.

The output of the calculation module 3' is also connected to the input of a register 7. The register 7 is connected to the second input of the calculation module 3' in such a way that the value present at the second input of the subtractor 31', compared with the value buffered in the register 7, is divided by sixty-four. The register 7 has a further input Cl via which the contents of the register 7 can be set to zero through a control signal S2. This control signal is generated by a control circuit not shown.

When calculating the number of components for transmitting the entire actual sub-block, the mean value of the actual sub-block is calculated and subsequently the difference values between the actual sub-block and a sub-block all of whose pixels have the calculated mean value are determined and summed. Advantageously, the calculation module 3' composed of the subtractor 31', the device 32' for forming the absolute value and the summing device 33' can be used for these calculations. To this end the mean value of the actual sub-block is determined in a first calculation step by means of this calculation module 3' and the difference values between the actual sub-block and the mean value are formed in a second calculation step.

For calculating the mean value of the actual sub-block all luminance and all chrominance values of the pixels of a sub-block must be added up. However, since the actual sub-block is first applied to the subtractor 31', the contents of the register 7 are initially set to zero by the control signal S2. Consequently, the value zero is present at the second input of the subtractor 31'. In this way the values of the pixels pass the subtractor 31' without a change of their values because only the value zero is subtracted from each pixel of the actual sub-block. Since all pixel values are positive, they also pass the device 32' for forming the absolute value without any change. In this way the summed value of all individual pixels of the actual sub-block is present at the output of the summing device 33'. This value is transferred to the register 7 and divided by sixty-four in this register. The number sixty-four corresponds to the number of pixels of a sub-block so that the arithmetic mean value of the pixels of a sub-block is formed in this way. The division by sixty-four is realized in the embodiment by the wiring of the outputs of the register 7 in which the eight lowermost outputs of the register 7 are left open. The output of the ninth bit is connected to the input of the first bit of the subtractor 31', the output of the tenth bit is connected to the input of the second bit of the subtractor 31', and so forth.

In this way the mean value of the actual sub-block is present in the second calculation step at the second input of the subtractor 31'. The subtractor 31' now calculates the differences between the actual sub-block and the arithmetic mean value of the actual sub-block. The absolute values are formed from these values and summed in the summing device 33'. The result of this calculation is stored in the mean value register 5. With reference to the data stored in the minimum value register 4 and the mean value register 5 the characteristic curve encoding selector 6 decides in known manner in which case the transmission of a motion vector or the transmission of the entire actual sub-block is more advantageous.

Due to this calculation of the intraframe value in two process runs an additional summing device for calculating the mean value of a sub-block is not necessary. This leads to a quite considerable economy because this summing device should also be constructed as a parallel processing unit due to the high processing rate. This is particularly advantageous because the same calculation module can also be used for the intraframe value calculation as the calculation module used for the motion estimator. This leads to a saving in development costs for the calculation module and it provides an economical advantage if the calculation module is manufactured as an integrated circuit. Instead of two different integrated circuits only one can be designed, tested and produced. In any way the cost aspect is more favorable if an integrated circuit is manufactured in double quantities rather than manufacturing two different integrated circuits.

Figure 3:
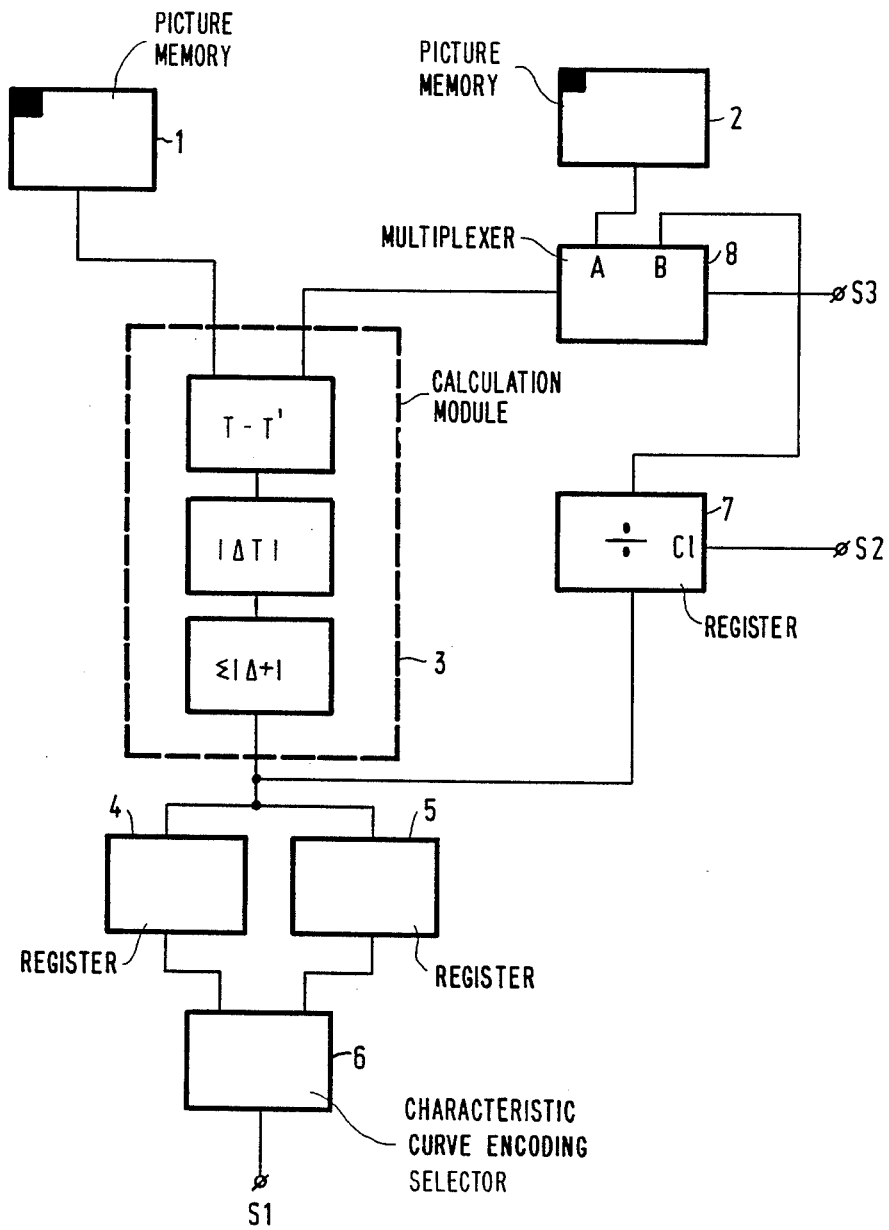
FIG. 3 shows a combination of a motion estimator and an inter-intraframe encoding selector.

FIG. 3 shows a very advantageous embodiment of the invention. FIG. 3 shows diagrammatically the structure of a combination of a motion estimator and an inter-intraframe encoding selector having only one calculation module. The elements whose functions are the same as those in FIGS. 1 and 2 have the same references. The embodiment comprises a first and a second picture memory 1, 2, a calculation module 3, a minimum value register 4, a mean value register 5, a characteristic curve encoding selector 6, a register 7 and a multiplexer 8. The first input of the calculation module is connected to the first picture memory 1 via a control circuit not shown. The output of the calculation module 3 is connected to the inputs of the minimum value register 4 and the mean value register 5. The output values of the calculation module 3 are stored selectively in the minimum value register 4 or in the mean value register 5 by control commands of a control circuit not shown. The output values of the minimum value register 4 and the mean value register 5 are applied to the inputs of the characteristic curve encoding selector 6. The output of the calculation module 3 is also connected to the input of the register 7 whose output is connected to a second input B of a multiplexer 8. A first input A of the multiplexer is connected to the second picture memory 2 via a search circuit not shown. The output of the multiplexer is connected to the second input of the calculation module 3. The input A or the input B is selectively connected to the output of the multiplexer by means of a control pulse S3 from a control circuit not shown.

Dependent on the control pulses generated by the control circuit (not shown) the circuit arrangement (shown) selectively operates as a motion estimator or as an inter-intraframe encoding selector. If the control pulse S2 connects the input A of the multiplexer to the output of the multiplexer 8, this circuit completely corresponds to the motion estimator shown in FIG. 1. If on the other hand the control signal S2 connects the input B of the multiplexer to the output of the multiplexer 8, the circuit shown in FIG. 3 completely corresponds to the inter-intraframe encoding selector shown and described in FIG. 2. When the circuit is in the inter-intraframe encoding selector mode, either the value in register 7 or alternatively the output of multiplexer 8 can initially be set to zero in response to a control command from signal output S1. In this way it is possible to operate the circuit arrangement shown in the embodiment in a quasi time-division multiplex mode, either as a motion estimator or as an inter-intraframe encoding selector while only one calculation module 3 is required. This is particularly advantageous because the complicated structure of the calculation module 3 considerably contributes to the development costs and the overall price of a hybrid encoder.

We claim:

1. A hybrid encoder for video pictures in which neighboring pixels of an actual video picture are combined into a plurality of actual sub-blocks, which encoder comprises a motion estimator and an inter-intraframe encoding selector, wherein said motion estimator and said inter-intraframe encoding selector comprise a common calculation module.

2. A hybrid encoder as claimed in claim 1 wherein the calculation module comprises a subtractor whose output signal is applied via a device for forming an absolute value to a summing device, a first actual sub-block being applied to a first input of the subtractor.

3. A circuit arrangement as claimed in claim 2 wherein a second input of the subtractor is connected to the output of a multiplexer and a first input of the multiplexer is connected to a picture memory in which a plurality of previous sub-blocks of a previous video picture are stored and in that a second input of the multiplexer is connected to a register whose input is connected to the output of the calculation module.

4. A circuit arrangement as claimed in claim 3, wherein the output value of the multiplexer or the contents of the register is set to zero by means of a control command.

5. A circuit arrangement as claimed in claim 3 wherein the output value of the register is reduced by a predetermined factor with respect to the input value of the register.

6. A circuit arrangement as claimed in claim 5, wherein the factor corresponds to the reciprocal value of the number of pixels of said first actual sub-block.

* * * * *